United States Patent [19]

Scappator et al.

[11] 3,768,133

[45] Oct. 30, 1973

[54] METHOD AND APPARATUS FOR STRIPPING FILM FROM A FILM CARTRIDGE

[75] Inventors: Vincent S. Scappator, Buffalo; Allan S. Yetter, Rochester, both of N.Y.

[73] Assignee: Eastman Kodak Company, Rochester, N.Y.

[22] Filed: Nov. 12, 1971

[21] Appl. No.: 198,168

[52] U.S. Cl............. 29/200 D, 29/208 E, 29/208 F, 225/23, 225/93, 408/87
[51] Int. Cl........................ B23p 19/00, B23p 19/04
[58] Field of Search................ 29/200 D, 430, 407, 29/200 R, 200 B, 208 F, 208 C, 208 E, 208 D; 225/23, 2, 96, 93; 408/87

[56] References Cited
UNITED STATES PATENTS

| | | | |
|---|---|---|---|
| 2,096,346 | 10/1937 | Sharp et al. | 29/208 C |
| 3,265,263 | 8/1966 | Lafontant et al. | 225/2 |
| 3,364,551 | 1/1968 | Napor et al. | 29/208 D |
| 3,364,552 | 1/1968 | Napor et al. | 29/208 D |
| 3,429,042 | 2/1969 | Lawrence et al. | 408/87 |
| 3,659,330 | 5/1972 | De Villier et al. | 29/208 C |

*Primary Examiner*—Thomas H. Eager
*Attorney*—William T. French et al.

[57] ABSTRACT

A method and apparatus for stripping exposed film from a film cartridge and feeding the stripped film into a processor or onto a take-up reel. The stripping apparatus comprises a plurality of work stations spaced along the periphery of a circular work table for supporting one or more film cartridges. The cartridges are of the type having a spool of film, an anti-backup ratchet to prevent rotation of the spool in a direction to permit stripping the film from the cartridge, and an exposure aperture against which the film is pressed by a pressure plate. The work table is indexed in steps for transporting each film cartridge successively through the work stations. At the first station, a code on the film cartridge such as a notch is sensed by any suitable sensing mechanism. If the correct code is sensed indicating a predetermined type of film, a film advancing mechanism and a pawl and ratchet disabling mechanism at the first station are operated. After the ratchet is disabled, the enabled film advancing mechanism engages the film in the cartridge and advances the film adjacent the leading end through the cartridge aperture forming a film loop extending out of the cartridge. Upon signal by the operator or operator controlled mechanical element of the system, the work table is indexed advancing the cartridge to the second station where the film cartridge pressure plate and antibackup ratchet are both disabled. The operator preferably manually grasps the film loop and splices it to the trailing end of the previous film strip, and a film feeder in engagement therewith strips the film from the cartridge and into a slack box. After the film has been stripped from the cartridge, the operator preferably severs the film from the cartridge, and actuates an indexing mechanism for indexing the work table one station. When the work table and cartridge reach the ejecting station, the empty cartridge is automatically ejected.

13 Claims, 6 Drawing Figures

VINCENT S. SCAPPATOR
ALLAN S. YETTER
INVENTORS

BY Steve W. Gremban

ATTORNEY

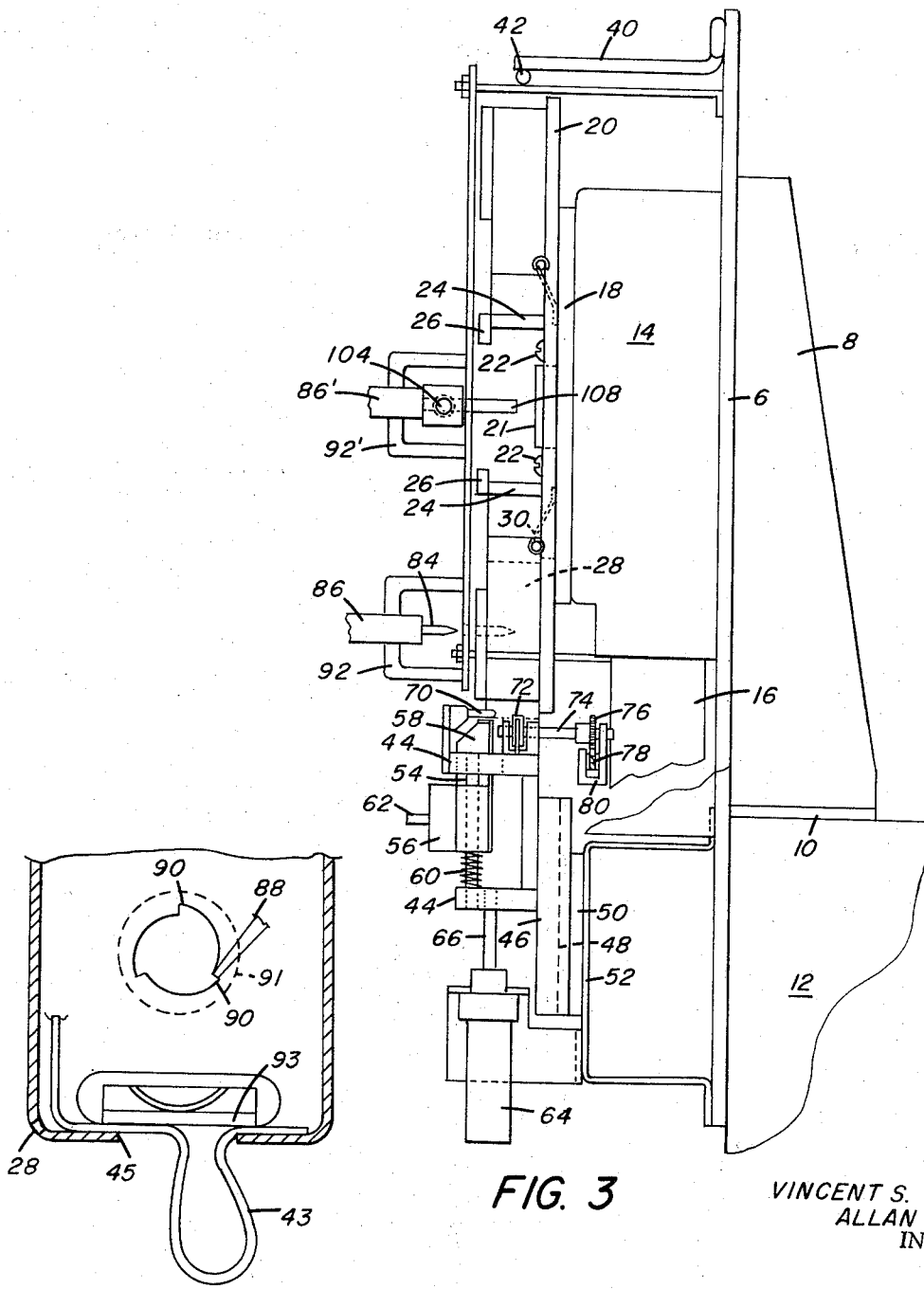

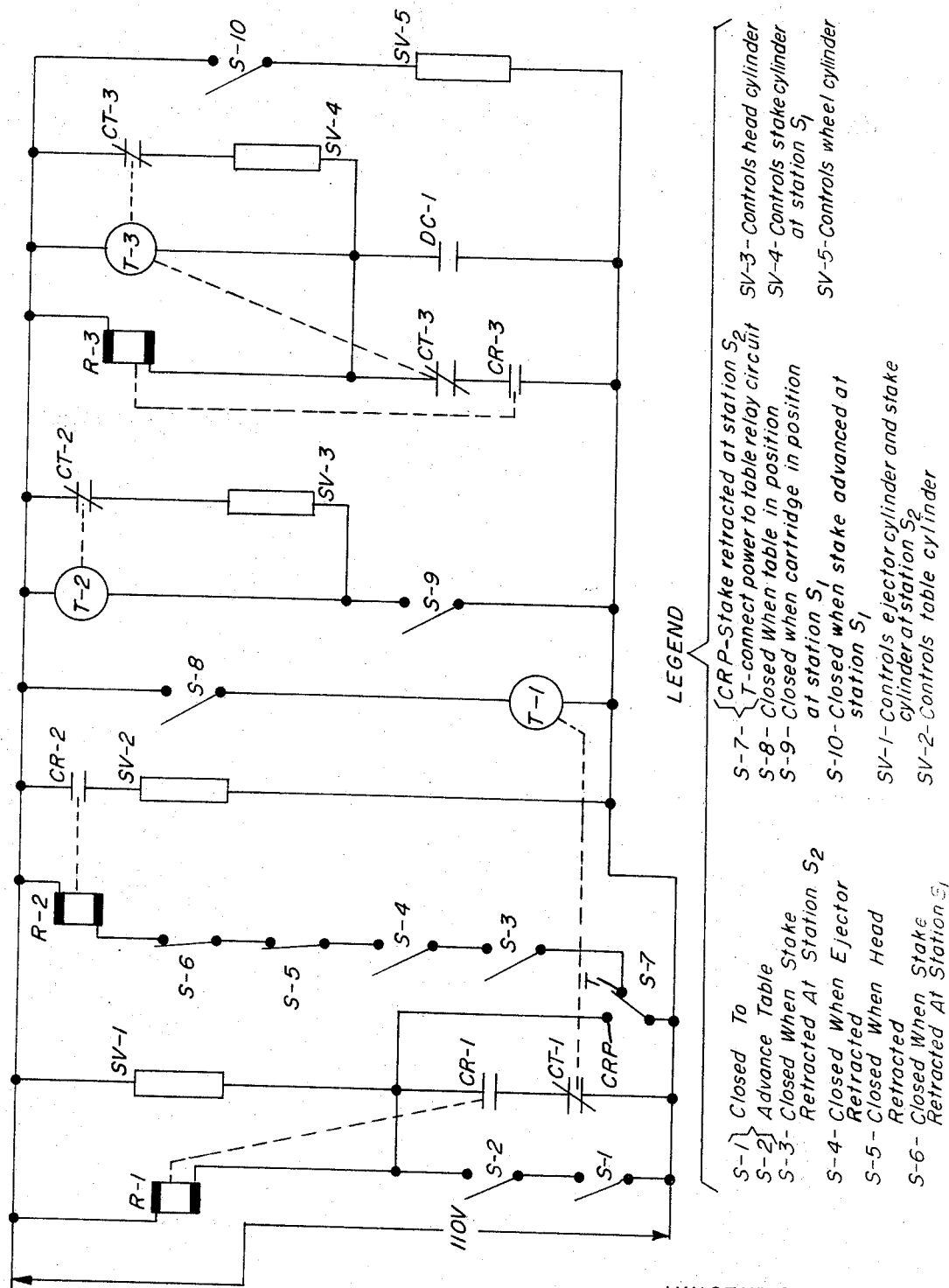

METHOD AND APPARATUS FOR STRIPPING FILM FROM A FILM CARTRIDGE

BACKGROUND OF THE INVENTION

1. Field of the Invention

This invention relates generally to film cartridges, and more specifically to a method and apparatus for stripping exposed film from a film cartridge for processing.

2. Description of the Prior Art

It is known in the photographic art to provide cartridge openers for use in dark rooms which generally include a hole saw or spinning cutter which cuts through the plastic case of a film cartridge and provides an opening of sufficient size to remove the exposed film therefrom. A cartridge opening device of this general type is disclosed in U.S. Pat. No. 3,429,042. It is further known to provide a cartridge opening device for breaking open expendable film cartridges to remove the exposed film therefrom. Such a cartridge opening device is disclosed in U.S. Pat. No. 3,265,263. One of the disadvantages of such prior art cartridge opening devices is that generally bits of plastic are produced during the opening of the cartridge which might inadvertently engage the exposed film and scratch or otherwise damage the emulsion during the processing procedure.

After a film cartridge containing exposed film is opened, the film may be removed therefrom in different ways. If the processor is one who handles a large volume of film, he will probably pull the end of the film from the cartridge, splice it to a leader or other film on a large rewind wheel, and withdraw the film from the take-up spool in the cartridge while the spool is maintained in a rotatable state in the opened cartridge. On the other hand, if the processor is one having a smaller volume of business, he might want to remove the entire take-up spool from the cartridge and place it on a spindle from which the film can be withdrawn and wound onto a large processing supply reel, or fed directly into a processing tank adapted to handle short lengths of film. In any case, the opening of the cartridge and the removal of the film therefrom must be done in the dark because the exposed film is still sensitive to light. The cartridge opening and film removal must be done in such a manner that the processor does not lose control of the spool of film in the cartridge, and no chips of plastic are generated during the opening of the cartridge which might inadvertently scratch or damage the film.

SUMMARY OF THE INVENTION

This invention includes within its scope a method and apparatus for stripping exposed film from a film cartridge for processing. A plurality of angularly spaced-apart work stations are arranged around the periphery of a circular, rotatable work table located in a dark room adjacent a processing station. The work table supports one or more film cartridges of the type having a spool of film, an antibackup ratchet to prevent rotation of the spool in a direction to permit unwinding or stripping of film from the cartridge, and an exposure aperture against which the film is pressed by an aperture plate. The film cartridges are advanced in succession through the work stations. Since film cartridges received from customers by the processor contain different types of film requiring different processing, the film cartridges are initially sorted at the receiving station, and then sent to the work tables located adjacent corresponding processing stations. To protect or insure against missorting of an occasional cartridge, or missending of an entire tray of cartridges to a work table at a processing station handling film requiring a different processing procedure, a sensing mechanism is provided at the first station of each work table for sensing notches or the like on the cartridge indicating the type of film contained therein. If the film cartridge and film contained therein is not the correct type, the antibackup ratchet disabling means and film advancing means which are also positioned at the first station are not operated. If the film is the correct type for the processing procedure which is normally the case, the ratchet disabling means and film advancing means are operated causing the ratchet to be temporarily disabled, and the film adjacent the leading end within the cartridge to be advanced through the cartridge exposure aperture in the form of a short film loop. The work table upon signal of the operator or operator controlled mechanism is then indexed by any suitable commercially available indexing mechanism for advancing the cartridge from the first station to the second station. When the cartridge reaches the second station, the pressure plate and antibackup ratchet on the cartridge are automatically disabled, and the film is free to be stripped from the cartridge. The processor grasps the previously formed film loop extending from the cartridge, splices it to the trailing end of the previous film strip, and actuates a film feeder comprising film stripping rollers or the like in engagement with the previous film strip for stripping the film at high speed from the cartridge and feeding it into any suitable slack box. The film in the slack box may be wound onto a take-up reel rotated by any suitable drive means at low speed, or fed directly into a processing device, preferably via a leader.

After the film has been stripped from the cartridge at the second station, the operator severs the trailing end of the film from the cartridge spool, and such action may be designed to actuate the work table indexing mechanism for advancing the empty cartridge a single step to an inactive station. Upon subsequent operation of the indexing mechanism, the cartridge is advanced to an ejecting station where the cartridge is ejected from the work table into any suitable receptacle.

If a cartridge contains film requiring a different processing procedure, the sensing mechanism at the first station will not respond to the code marks on the cartridge, and the ratchet disabling means and film advancing means at the first station will not be enabled or operated to disable the ratchet and advance the film. At the same time, an annunciator in the form of a light is actuated visually indicating that an improper cartridge is being sensed. When the proper cartridge is advanced by the work table to the second station, the operator manually senses the absence of a film loop when he attempts to grasp it for removal from the cartridge, and confirms this by checking the indicator light. The operator removes the cartridge, places it into a folder, and then into a discharge bin from which it is transported to the work table at a processing station having a processing procedure compatible with the type of film in the cartridge.

It is therefore an object of the present invention to provide a method and apparatus for stripping exposed film from a film cartridge without breaking open or cutting the cartridge.

Another object of the invention is to provide an apparatus and method for stripping exposed film from a film cartridge that is of simple design and construction, thoroughly reliable and efficient in operation, and economical to manufacture.

Still another object of the invention is to provide a method and apparatus for stripping film from a film cartridge under darkroom conditions in which manual operations are minimized.

Another object of the invention is to provide a method and apparatus for stripping exposed film from a film cartridge in which film damage due to the generation of plastic chips from breaking or cutting the cartridge is eliminated.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawings, in which:

FIG. 3 is a right side elevational view of the apparatus of FIG. 1;

FIG. 4 is a segmental view of a cartridge with the top cover removed to illustrate the pressure plate, spool ratchet and film loop;

FIG. 5 is a schematic electrical wiring diagram for the film stripping apparatus.

DESCRIPTION OF THE PREFERRED EMBODIMENT

Figure 1:
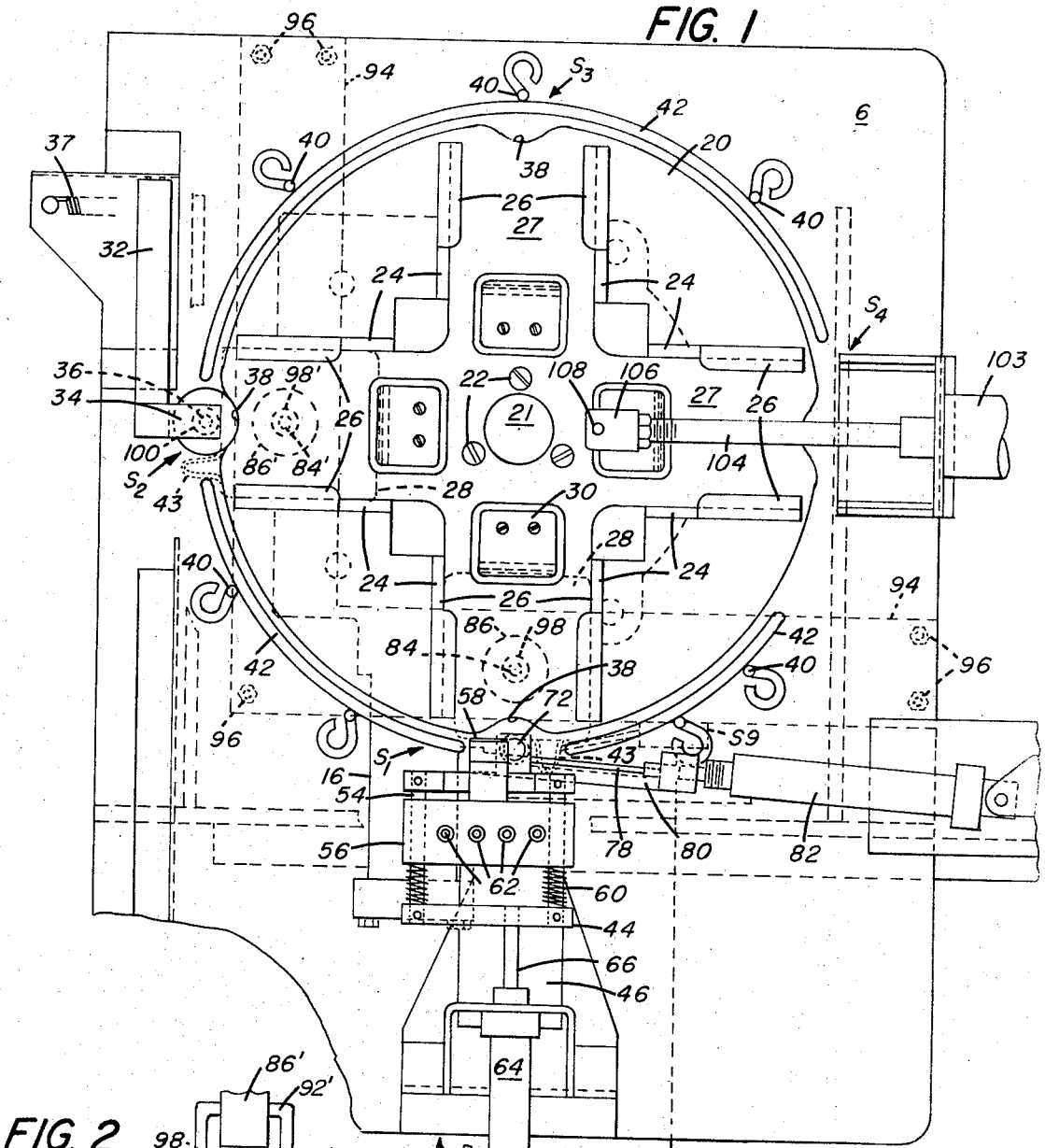
FIG. 1 is a side elevational view of a film stripping apparatus for practicing the film stripping method of this invention, and in which an L-shaped support plate and ratchet disabling means supported thereby are shown dotted for purposes of clarity.

Because film cartridges and processing apparatus are well known, the present description will be directed in particular to elements forming part of, or cooperating more directly with the present invention. Film cartridge elements and processing apparatus not specifically shown or described herein should be understood to be selectable from those known in the art.

With reference to the drawings, the stripping apparatus of this invention is mounted on a vertically upstanding base plate 6 secured by ribs 8 and a laterally extending flange 10 to any suitable support such as a table 12 or the like, as best seen in FIG. 3. A commercially available indexing fixture 14 is secured to plate 6 by any suitable means, and operated by an air cylinder 16 for intermittently indexing in 90° steps a circular feed table 18, which is rotatably supported by fixture 14. The feed table 18 has a spindle 21 onto which a circular work table 20 is mounted and secured to table 18 by screws 22. The work table 20 has a plurality of 90° angle irons 24 laterally extending from the work table and provided with inwardly extending ribs 26. The angle irons 24 are secured to the upper surface of table 20 by welding or the like, and arranged to form four film cartridge nests or receptacles 27 angularly spaced 90° apart. A film cartridge 28 (FIGS. 1 and 4) may be manually oriented with its aperture in a downward position, and inserted from the center of work table 20 into the lowermost receptacle to the dotted position seen in FIG. 1. During such insertion, the cartridge 28 depresses a spring 30 having one end secured to feed table 18 and its free end extending through an opening in work table 20. When fully inserted, the free end of spring 30 provides a releasable stop for the rear end of cartridge 28. The work table 20 is releasably held by a detent means with the receptacles 27 in register with a plurality of work stations $S_1$, $S_2$, $S_3$, and $S_4$ angularly spaced 90° apart around the periphery of work table 20. The detent means comprises a lever 32 (FIGS. 1 and 2) having a slot at one end for receiving a roller 34 mounted on a shaft 36 journaled in the lever end. The roller 34 is biased by a spring 37 into engagement with the periphery of work table 20, and rides on the periphery and nests in suitable notches 38 therein angularly spaced 90° apart for properly positioning the work table relative to the work stations. The work table 20 may be surrounded by any suitable laterally extending pins 40 (FIGS. 1 and 3) secured to base plate 6 to which arcuate guard rods 42 are secured, with appropriate access openings at the work stations $S_1 S_2$, and $S_4$.

As mentioned heretofore, film cartridges 28 received from customers normally contain different types of film requiring different processing procedures. This necessitates some means, not shown, of presorting the cartridges so that film of the same type is supplied to the proper work place for processing. To insure against an occasional cartridge or tray of cartridges containing one type of film from being processed in a processing precedure and chemicals designed to process a different type of film, reciprocally movable sensing means of any suitable type is located at work station $S_1$ (located at the 6 o'clock position in FIG. 1) for sensing each of the film cartridges 28 initially manually inserted into the receptacle 27 in alignment with station $S_1$. If a cartridge contains film of a type requiring a different processing procedure, antibackup rachet disabling means for disabling the cartridge ratchet to permit film advance and film advancing means for advancing film from the cartridge at station $S_1$, and to be described hereinafter, remain in their normal retracted position. However, if the cartridge contains the right type of film to be processed, the film advancing means and antibackup ratchet disabling means are actuated or advanced for disabling the antibackup rachet and engaging and advancing film from cartridge 28 to form a film loop 43 adjacent the end of the film and extending out of the cartridge aperture 45 as best seen in FIG. 4.

To achieve the cartridge sensing and film advancing functions at station $S_1$, a U-shaped support bracket 44 (see FIG. 1 and 3) is secured to a bed plate 46 having a longitudinal slot 48 for receiving a complementary way 50 on a rigid bracket 52 mounted on base plate 6. Way 50 slidably supports bed plate 46 and bracket 44 for reciprocal movement in a vertical direction between a normal inactive or retracted position and an active or advanced position. The support bracket 44 has posts 54 for slidably supporting a sensing air nanifold 56 having a sensing head 58 biased by springs 60 toward the cartridge. The sensing head 58 has air ports, not shown, and the head is held by springs 60 in firm engagement with the notched surface, not shown, of cartridge 28 when bracket 44 is in its advanced position as seen in FIGS. 1 and 3. Depending upon the position of the notches in the cartridge, the sensing head 58 generates back pressure through air nozzles 62 in manifold 56 for controlling a detector contact switch DC-1 (FIG. 5) coupled to the film advancing means and antibackup ratchet disabling means to be described hereinafter. If a cartridge contains a type of film to be processed by a different processing procedure, the back pressure is not generated and the detector switch DC-1 remains open; such switch being closed to enable the film advancing means and antibackup clutch disabling means only when the notches in a cartridge containing the correct type of film are sensed. Although the sensing means 58 is shown as a fluidic sensor, any other suitable sensing means may be used that is capable of sensing notches or other indicia on cartridge 28, and in response thereto enabling the film advancing means and antibackup ratchet disabling means. The bracket 44 is movable between its normal inactive or retracted position in which head 58 is withdrawn from cartridge 28, and its active or advanced position in which head 58 engages the notched surface of the cartridge by any suitable means such as an air cylinder 64 having a cylinder rod 66 secured to bracket 44. The air cylinder 64 is actuated through any suitable pneumatic system including a solenoid operated air valve SV-3 (See FIG. 6) by normally open switch S-9 (see FIG. 1) which is closed by the insertion of a cartridge 28 into receptacle 27 at station $S_1$. As bracket 44 is moved to its advanced position, a pin 70 (see FIG. 3) secured thereto engages a slot, not shown, in cartridge 28 for laterally orienting the cartridge relative to sensing head 58. The freely floating sensing head 58 firmly engages the notched wall of the cartridge and forces the cartridge into engagement with spring 30.

Figure 6:
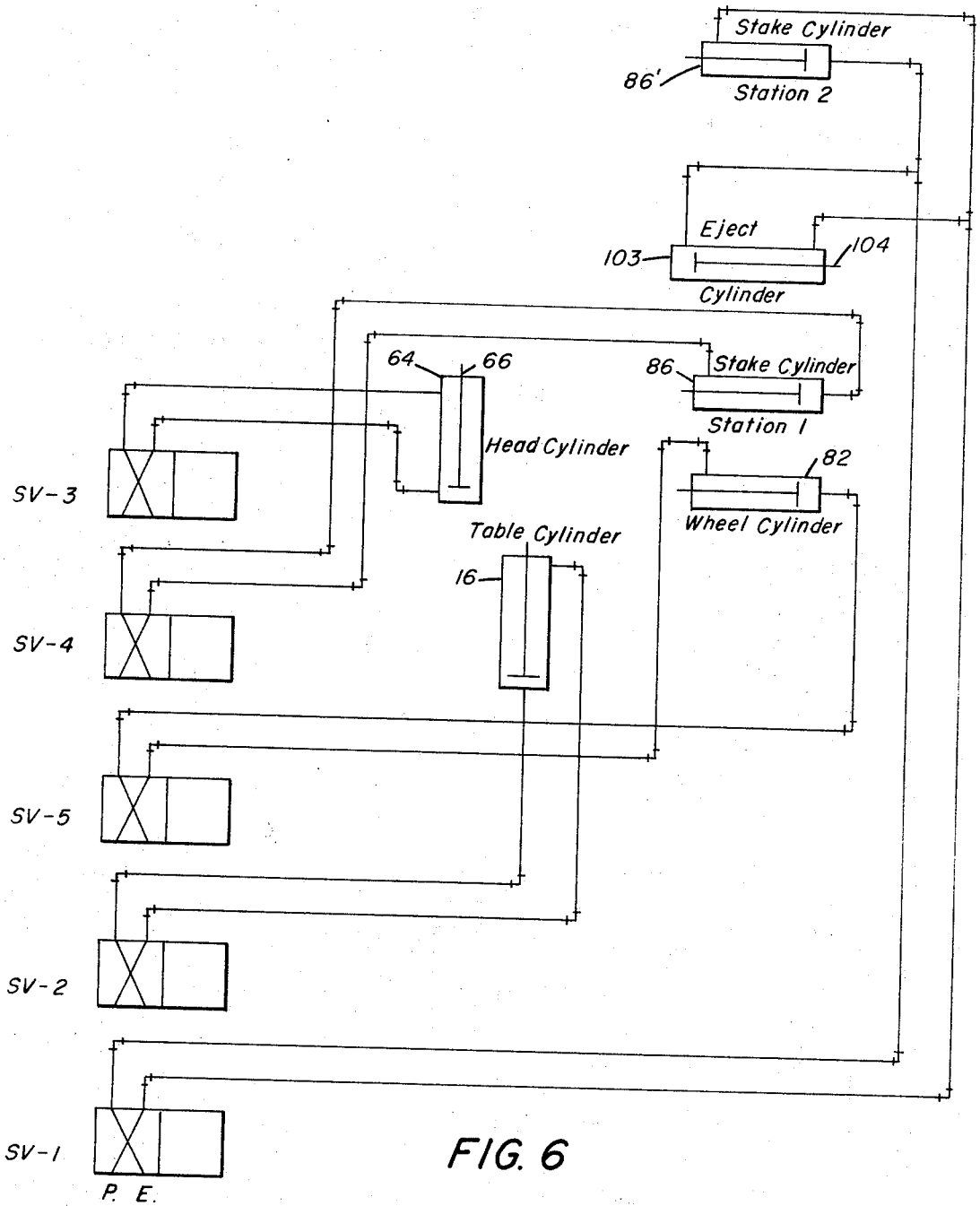
FIG. 6 is a schematic block diagram of the pneumatic system for the film stripping apparatus.

The film advancing means at station $S_1$ comprises a film advancing wheel 71 (see FIGS. 1 and 3) mounted on a shaft 74 rotatably supported by bracket 44, and movable into the cartridge exposure aperture and into frictional driving engagement with the film when support bracket 44 is moved to its active advanced position. The shaft 74 and wheel 72 are driven for advancing the film adjacent the film end out of the cartridge aperture 45 to provide film loop 43 as best seen in FIG. 4. The wheel drive means comprises any suitable means such as a gear 76 on shaft 74 which is in meshing engagement with a rack 78 guided by a frame 80 and reciprocally driven by any suitable air cylinder 82 through a solenoid operated air valve SV-5 (FIG. 6).

The antibackup ratchet disabling means at stations $S_1$ and $S_2$ (located at the 9 0'clock position) each respectively comprises a tapered punch or stake 84, 84' coupled to or forming part of a cylinder rod of an air cylinder 86, 86' for piercing a wall of the cartridge and camming a clutch arm 88 (FIG. 4) into an inoperative position in which it is no longer engageable with a ratchet 90, and hence is ineffective to prevent rotation of the cartridge spool 91 in a direction for unwinding or stripping film from the cartridge. The cylinders 86, 86' are mounted by brackets 92, 92' to an L-shaped plate 94 (see FIGS. 1 and 2) secured to base plate 6 by nuts and bolts 96. The air cylinders 86, 86' are controlled by solenoid operated air valves SV-4 and SV-1 respectively such that stake 84 at station $S_1$ is normally in a retracted position whereas stake 84' at station $S_2$ is normally in its advanced position extending into a receptacle 27. Upon movement of stake 84 at station $S_1$ from its normal retracted position as seen in full lines in FIG. 2 to its advanced position as seen dotted in FIG. 2, stake 84 passes through opening 98 in plate 94 and pierces the cartridge side wall to disable the cartridge antibackup ratchet 90 (FIG. 4) by camming arm 88 out of engagement therewith. The pressure applied to stake 84' at station $S_2$ by the pneumatic system is insufficient to pierce the cartridge wall in order to prevent damage to cartridges that are rejected by the sensing system (contains improper film for the processing chemistry) and hence not pierced at station $S_1$. The pressure is sufficient to force stake 84' through the opening previously made by stake 84 in acceptable cartridges at station $S_1$.

The sensing head 58, wheel 72 and stake 84 at station $S_1$ remain advanced and operative a sufficient period of time established by any suitable electrical or mechanical timing means T-2 and T-3 (FIG. 5) to accomplish their objectives. After the established time period, bracket 44 is returned by cylinder 64 to its retracted position withdrawing sensing head 58 and film advancing wheel 72 from cartridge 28. In addition, wheel stake and st 84 are returned by cylinders 82, 86 respectively to their normal retracted positions. Upon manual or mechanical actuation of switches S-1 and S-2 (FIG. 5) by the operator at work station $S_2$, work table 20 is indexed 90° by cylinder 16 moving the film cartridge from station $S_1$ into alignment with station $S_2$.

Figure 2:
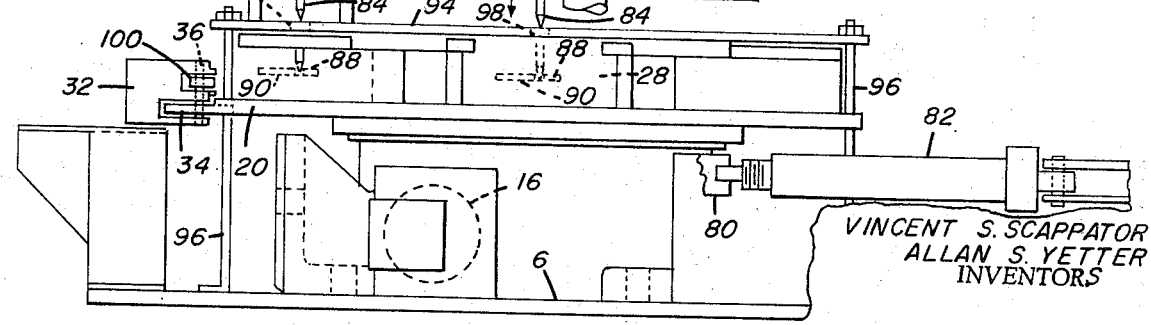
FIG. 2 is a bottom view of the apparatus of FIG. 1 with the film advancing means and cartridge sensing means omitted for purposes of clarity.

At work station $S_2$, the cartridge pressure plate 93 (FIG. 4) is automatically disabled, as well as the antibackup ratchet 90 of the film cartridge to permit grasping the film loop, splicing it to the trailing end of the previous film strip, and actuating the film feeder for stripping the film from the cartridge into a slack box, not shown. The mechanism for disabling pressure plate 93 comprises a roller 100 rotatably mounted on detent roller shaft 36 in a slot adjacent roller 34 as best seen in FIG. 2. The roller 100 is automatically movable by the detent lever spring 37 into engagement with opposite edges of pressure plate 93 for moving the pressure plate away from the film simultaneously as detent roller 34 bottoms in a notch 38 on work table 20. The roller 100 preferably has a peripheral center groove in register with the image frames on the film so that the image portion of the film is not engaged by the roller. In addition, solenoid valve SV-1 of the antibackup ratchet disabling means at station $S_2$ is de-energized by the opening of switch CT-1 by timer T-1 (FIG. 5) causing cylinder 86' to drive stake 84' through the opening in the wall of cartridge 28 previously formed by stake 84 at station $S_1$ and withdraw clutch arm 88 from ratchet 90. After ratchet 90 is disabled, the operator grasps the film loop 43 of the film, splices it to the trailing end of the previous film strip, and actuates a film transport means, not shown, such as a pair of opposed drive rollers in engagement with the previous film strip for stripping the film from the cartridge and into a slack box, not shown. While the film stripping operation is taking place at station $S_2$, another film cartridge 28 is inserted at station $S_1$ closing switch S-9. This actuates air cylinder 64 through valve SV-3 for moving bracket 44 to its advanced position where sensing head 58 senses the cartridge notches, and if the cartridge contains the proper type of film, actuates stake 84 for disabling antibackup ratchet 90. In addition, the film advancing wheel 72 is actuated through cylinder 82 and valve SV-5 (FIG. 6) for advancing a loop of film 43. After all of the film has been stripped from the cartridge at station $S_2$, the operator severs the film from the cartridge spool, and either through such action or manually actuates switches S-1 and S-2 connected to the indexing mechanism for indexing work table 20 through an angle of 90° advancing the empty cartridge to inactive station $S_3$ located at the 12 o'clock position in FIG. 1, and advancing the cartridge from station $S_1$ to station $S_2$. Following the performance of the aforementioned operations at stations $S_1$ and $S_2$, table 20 is again indexed 90° advancing the empty cartridge from station $S_3$ to the ejecting station $S_4$ located at the 3 o'clock position in FIG. 1.

THe ejecting mechanism at ejecting station $S_4$ comprises an air cylinder 103 for reciprocally moving a cylinder rod 104 to which a cartridge pusher or ejector is secured comprising a flange 106 having a depending pin 108. The cylinder 103 is actuated by any suitable air pressure source through valve SV-1 (FIG. 6) for movement of cylinder rod 104 and pin 108 between a normal ejecting position in which pin 108 is within cartridge receptacle 26, and a retracted position in which the pin is withdrawn from the receptacle. When table 20 is indexed a 90° increment to advance an empty cartridge from station $S_3$ to ejecting station $S_4$, the indexing mechanism as it nears the end of its advance closes switch S-8 to timer T-1 opening switch CT-1 after a predetermined time set by timer T-1. This automatically de-energizes valve SV-1 for cylinder 103 causing cylinder rod 104 to move from its retracted position to its normal advanced ejecting position. Such movement causes pin 108 to enter the receptacle at station $S_4$, and to engage and eject the empty cartridge 28 from the receptacle into any suitable storage bin or the like, not shown.

The operation of the film stripping apparatus of this invention will now be fully described with particular reference to FIGS. 5 and 6. In the normal position of the stripping mechanism, stake 84' at station $S_2$ is in its advanced ratchet disabling position, pressure plate disabling wheel 100 at station $S_2$ is in the pressure plate disabling position, and ejecting pin 108 at station $S_4$ is in the ejecting position. The operator normally initiates a cycle of operation by manually closing the normally open spaced apart switches S-1 and S-2 (FIG. 5) designed to minimize injury to the operator by requiring the operator to use both hands simultaneously. If desired, the cycle of operation may be initiated by the closing of switches S-1, S-2 by something other than manual means such as by another machine function, namely operation of the film cut-off knife, splicer, or the like. Power is connected to solenoid valve SV-1 which directs air under pressure to stake cylinder 86' at station $S_2$ and ejecting cylinder 103 causing stake 84' and ejecting pin 108 to be retracted clear of the respective cartridge receptacles 27. The holding relay R-1 is also energized for closing normally open relay switch contact CR-1 which through a normally closed contact CT-1 maintains solenoid valve SV-1 in an energized state when switches S-1 and S-2 are released. When the ratchet disabling and ejecting mechanisms including stake 84' and pin 108 are moved to their withdrawin or retracted positions, microswitches S-3 and S-4 respectively are mechanically closed by the mechanisms for completing a circuit to relay R-2 through switches S-5 and S-6 (closed respectively by head 58 and stake 84 at station $S_1$ in their normal retracted positions). Energized relay R-2 closes normally open contact CR-2 for energizing solenoid valve SV-2 for directing air under pressure to table cylinder 16 for indexing table 20. When the table has indexed approximately 90°, it closes a microswitch S-8 for connecting power to timer T-1 which after a predetermined time interval opens normally closed timer contact CT-1. This de-energizes solenoid valve SV-1 causing cylinders 86, 103 to return stake 84' at station $S_2$ and ejecter pin 108 to their normal advanced positions within their corresponding cartridge receptacles 27.

Now to strip film from cartridges 28, the operator removes a cartridge from the cartridge tray, orients the cartridge with aperture 45 pointing down, and inserts it into a receptacle 27 at station $S_1$. When the cartridge bottoms in the receptacle, it closes switch S-9 connecting power through a normally closed timer contact CT-2 to solenoid valve SV-3 of head cylinder 64. Energization of solenoid SV-3 causes cylinder 64 to move head 58 to its advanced sensing position. At the same time, a timer T-2 is actuated which after a predetermined time such as 3 seconds opens normally closed timer contact CT-2 for de-energizing solenoid valve SV-3 and returning head 58 to its normal retracted position following the sensing operation. If the cartridge contains the type of film that is compatible with the processing procedure, pressure-sensitve detector switch contact DC-1 is closed by the sensing means 56, 58 connecting power through a normally closed timer contact switch CT-3 to solenoid valve SV-4 for the stake cylinder 86 at station $S_1$. Energization of solenoid valve SV-4 directs air under pressure to cylinder 86 causing stake 84 to move to its ratchet disabling position. The closed detector switch DC-1 further energizes a holding relay R-3 for closing normally open relay contact CR-3 for maintaining solenoid valve SV-4 in its energized state even though detector switch DC-1 opens upon return of the sensing head 58 to its normal position. As stake 84 advances to its ratchet disabling position, it closes microswitch S-10 through any suitable coupling, not shown, for connecting power to solenoid valve SV-5 for film transport wheel 72. The valve directs air under pressure to cylinder 82 for driving the wheel causing a loop of film 43 to be advanced from the cartridge as best seen in FIG. 4. The closing of normally open detector switch contact CD-1 also actuates a timer T-3 which after a time period of approximately 4 seconds opens the normally closed timer contact CT-3, disconnecting power to relay R-3 and timer T-3, and de-energizing solenoid valve SV-4 which returns stake 84 to its normal retracted position. This action mechanically opens switch S-10, de-energizing solenoid valve SV-5 for returning transport wheel 72 to its normal retracted position.

In the event a cartridge is introduced into a receptacle at station $S_1$ containing film that is not compatible with the processing procedure at the processing station, the detector switch DC-1 remains in its normal open position. Accordingly, solenoid valves SV-4 and SV-5 remain de-energized, and stake 84 and film transport wheel 72 controlled thereby remain in their normal retracted positions. Accordingly, a film loop 43 is not formed at station $S_1$, and when table 20 is indexed for moving the cartridge to station $S_2$, the operator can sense by touch the lack of a film loop. The operator confirms that the film is incompatible with the processing procedure by checking the annunciator, and if lit can then manually move switch S-7 to the cartridge release contact position (CRP) energizing solenoid SV-1 for moving stake 84' to its retracted position. This permits the operator to withdraw the cartridge from the receptacle at station $S_2$ and place it in a discard bin for return to the proper processing station. The operator can then initiate a table advance by closing switches S-1 and S-2 for indexing table 20 through 90°, such action closing switch S-8 which through timer T-1 and contact CT-1 de-energizes solenoid valve SV-1 for returning stake 84' at station $S_2$ and ejector pin 104 to their normal advanced positions extending into their corresponding cartridge receptacles.

In the event a film loop 43 is not formed at station $S_1$ for a cartridge containing film that is compatible with the processing procedure, due to malfunction of the loop former mechanism, or the like, the operator will check the annunciator, and if unlit will manually remove the film end from the cartridge and proceed to splice and strip. An interlock may be provided actuated by any suitable signal such as the signal which lights the annunciator for disabling the take-up means so that film cannot be stripped from the cartridge and fed into the slack box. The interlock may be returned to its unactuated condition by any suitable means such as removing the cartridge at station $S_2$, moving switch S-7 to the cartridge release position, or by the action of the removing pressure roller 100 from the cartridge operation.

This invention has been described in detail with particular reference to a preferred embodiment thereof, but it will be understood that variations and modifications can be effected within the spirit and scope of the invention as described hereinabove.

We claim:

1. In a mechanism to facilitate stripping film from a film cartridge of the type having a film pressure plate and an antibackup ratchet, the combination comprising:
    means for intermittently transporting a film cartridge in sequence through first, second and third work stations;
    means at said first work station for temporarily disabling the antibackup ratchet and for advancing film in the form of a film loop from the cartridge;
    means at said second work station spaced from said first work station for again temporarily disabling the antibackup ratchet in the cartridge to allow the film loop to be pulled and the film stripped from the cartridge; and
    means at said third work station spaced from said second work station for ejecting the stripped catridge.

2. The invention according to claim 1 wherein said film advancing means comprises a friction roller movable into driving engagement with the film.

3. The invention according to claim 1 wherein said film advancing means comprises a friction roller movable into driving engagement with the film, a gear secured to said roller, and a reciprocally movable gear rack for driving said gear.

4. The invention according to claim 1, and further comprising a film pressure plate disabling means for disabling the pressure plate when the cartridge is at said second station, and said ratchet disabling means comprises a power driven stake for piercing the cartridge and engaging and disabling the ratchet.

5. The invention according to claim 1 wherein said ejecting means comprises a power operated pusher.

6. The invention according to claim 1 wherein said transporting means comprises a rotatable table for supporting one or more cartridges in spaced relation, and means for indexing said table to intermittently advance the cartridge in sequence through said first, second and third work stations.

7. The invention according to claim 1 and further including sensing means at said first station for sensing a predetermined cartridge, and in response thereto to enable said film advancing means and said ratchet disabling means.

8. In a mechanism to facilitate stripping film from a film cartridge of the type having a film pressure plate at the cartridge exposure aperture for pressing the film against the aperture, and an antibackup one-way ratchet for preventing reverse rotation of the film, and combination comprising:
    a rotatable work table having a plurality of angularly spaced receptacles for receiving film cartridges;
    means for indexing said work table to intermittently advance each film cartridge in sequence through first, second and third work stations arranged around the periphery of said work table;
    means including a friction roller at said first work station for engaging and advancing film in the form of a film loop from a cartridge;
    means including a power driven stake at said first and second work stations for piercing a cartridge and engaging and temporarily disabling the antibackup ratchet;
    means including a pressure roller at said second work station for engaging and disabling the film pressure plate in the cartridge to facilitate stripping the film from the cartridge when the film loop is grasped and pulled; and
    means including a power driven pusher at said third work station spaced from said second work station for ejecting the stripped cartridge.

9. The invention according to claim 8 and further including sensing means at said first station for sensing a predetermined cartridge, and in response thereto to actuate said film advancing means.

10. The invention according to claim 8 and further including sensing means at said first station movable from a retracted position to an advanced position from sensing a predetermined cartridge, first power means for said sensing means actuatable by the positioning of a cartridge at the first station for moving said sensing means to its advanced position and said friction roller into engagement with the film, and second power means for said film advancing means responsive to said sensing means when it senses a predetermined cartridge for driving said friction roller to advance film from the cartridge.

11. A method for stripping film from a film cartridge of the type having a film pressure plate at the cartridge exposure aperture for pressing the film against the aperture, and an antibackup ratchet for preventing reverse rotation of the film, comprising the steps of:
    temporarily disabling the antibackup ratchet by piercing the cartridge with a stake;
    engaging the film adjacent the lead end of the film in the cartridge and advancing the film through the cartridge aperture in the form of a film loop; and securing the film loop to a take-up means for stripping the film from the cartridge upon operation of the take-up means.

12. The method according to claim 11, and further including the step of sensing each film cartridge and enabling the remaining steps only if the cartridge contains film of a predetermined type.

13. The method according to claim 11, and further comprising the step of disabling the cartridge pressure plate by depressing it with a roller.

* * * * *

PO-1050
(5/69)

UNITED STATES PATENT OFFICE
CERTIFICATE OF CORRECTION

Patent No. 3,768,133          Dated October 30, 1973

Inventor(s) Vincent S. Scappator and Allen S. Yetter

It is certified that error appears in the above-identified patent and that said Letters Patent are hereby corrected as shown below:

Column 4, lines 64 and 65, delete "nanifold" and insert -- manifold --.

Column 5, line 38, delete "71" and insert --72--.

Column 6, line 23, after "wheel" insert --72--.

Column 6, line 25, delete "stake and st 84" and insert --and stake 84--.

Column 7, line 15, delete "THe" and insert --The--.

Column 8, line 28, delete "sensitve" and insert --sensitive--.

Signed and sealed this 25th day of June 1974.

(SEAL)
Attest:

EDWARD M. FLETCHER, JR.
Attesting Officer

C. MARSHALL DANN
Commissioner of Patents